US012659959B2

(12) United States Patent
Li

(10) Patent No.: US 12,659,959 B2
(45) Date of Patent: Jun. 16, 2026

(54) UPLINK TRANSMISSION PROCESSING METHOD AND APPARATUS, AND TERMINAL

(71) Applicant: VIVO MOBILE COMMUNICATION CO., LTD., Chang'an Dongguan (CN)

(72) Inventor: Na Li, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 418 days.

(21) Appl. No.: 18/134,386

(22) Filed: Apr. 13, 2023

(65) Prior Publication Data

US 2023/0254867 A1      Aug. 10, 2023

Related U.S. Application Data

(63) Continuation of application No. PCT/CN2021/123537, filed on Oct. 13, 2021.

(30) Foreign Application Priority Data

Oct. 15, 2020    (CN) .......................... 202011105908.0

(51) Int. Cl.
*H04W 72/21*          (2023.01)
*H04W 52/14*          (2009.01)
*H04W 72/563*        (2023.01)

(52) U.S. Cl.
CPC ......... *H04W 72/21* (2023.01); *H04W 52/146* (2013.01); *H04W 72/563* (2023.01)

(58) Field of Classification Search
None
See application file for complete search history.

(56) References Cited

U.S. PATENT DOCUMENTS

2015/0341156 A1    11/2015  Yang et al.
2016/0157184 A1*    6/2016  Wang .................. H04W 52/281
                                                                    370/329

(Continued)

FOREIGN PATENT DOCUMENTS

CN          103220768 A        7/2013
CN          108811128 A      11/2018

(Continued)

OTHER PUBLICATIONS

International Search Report and Written Opinion issued in corresponding application No. PCT/CN2021/123537, dated Dec. 23, 2021.

(Continued)

*Primary Examiner* — Steve R Young
(74) *Attorney, Agent, or Firm* — Price Heneveld LLP

(57)          ABSTRACT

This application discloses an uplink transmission processing method and apparatus, and a terminal, which relate to the field of communication technologies. The method is applied to a terminal and includes: in a case that time domain resources of a first uplink transmission and a second uplink transmission overlap, performing at least of the following: determining a relative priority between the first uplink transmission and the second uplink transmission according to a first rule, and allocating transmission power of the first uplink transmission and the second uplink transmission based on the relative priority; or performing channel transmission according to a second rule.

15 Claims, 4 Drawing Sheets

(56) References Cited

U.S. PATENT DOCUMENTS

| | | | |
|---|---|---|---|
| 2016/0353387 A1 | 12/2016 | Gao et al. | |
| 2020/0037255 A1 | 1/2020 | Liu et al. | |
| 2020/0137695 A1 | 4/2020 | Papasakellariou | |
| 2020/0178263 A1 | 6/2020 | Shao | |
| 2020/0314762 A1 | 10/2020 | Hosseini et al. | |
| 2021/0037555 A1* | 2/2021 | Papasakellariou | H04L 1/0026 |
| 2021/0218451 A1 | 7/2021 | Li et al. | |
| 2022/0124773 A1 | 4/2022 | Gao et al. | |
| 2023/0217378 A1* | 7/2023 | Yuan | H04W 52/146 |
| | | | 455/522 |
| 2025/0016769 A1* | 1/2025 | Papasakellariou | H04L 1/1854 |
| 2025/0220589 A1* | 7/2025 | Pelletier | H04W 52/146 |

FOREIGN PATENT DOCUMENTS

| | | | |
|---|---|---|---|
| CN | 109392126 A1 | 2/2019 | |
| CN | 110366862 A | 10/2019 | |
| CN | 110858998 A | 3/2020 | |
| CN | 110971339 A | 4/2020 | |
| CN | 111435878 A | 7/2020 | |
| JP | 2016506199 A | 2/2016 | |
| JP | 2016530807 A | 9/2016 | |
| JP | 2017505061 A | 2/2017 | |
| WO | 2020148122 A1 | 7/2020 | |
| WO | 2020168351 A1 | 8/2020 | |
| WO | 2021195981 A1 | 10/2021 | |

OTHER PUBLICATIONS

Huawei, Hisilicon, "Remaining Issues for PUCCHI on SCELL," 3GPP TSG RAN WG1 Meeting, #81, R1-152461, Fukuoka, Japan, May 25-29, 2015.
Huawei, Hisilicon, "L1 Enhancements for URLLC," 3GPP TSG RAN WG1 Meeting #94bis, R1-1810157, Chengdu, China, Oct. 8-12, 2018.

* cited by examiner

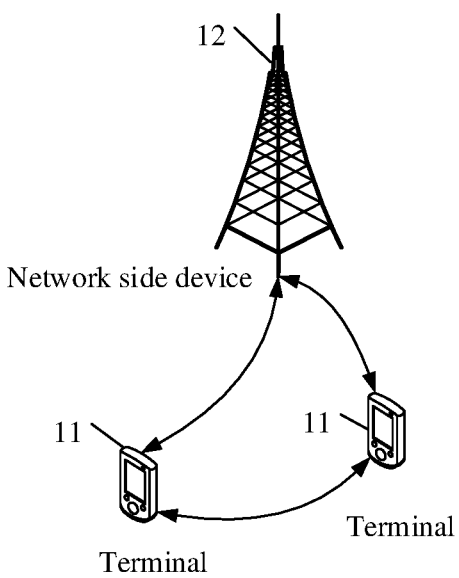

Network side device 11      11

Terminal

Terminal

FIG. 1

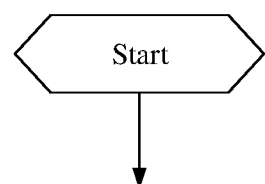

Start

In a case that time domain resources of a first uplink transmission and a second uplink transmission overlap, perform at least of the following:

determining a relative priority between the first uplink transmission and the second uplink transmission according to a first rule, and allocating transmission power of the first uplink transmission and the second uplink transmission based on the relative priority; or performing channel transmission according to a second rule

201

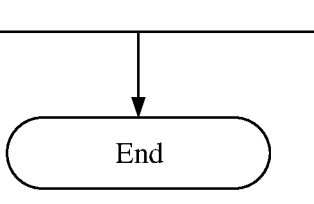

End

FIG. 2

CC0 | CC0 LP PUCCH carrying P-CSI or SP-CSI

CC1 | CC1 LP PUSCH1 carrying A-CSI

CC2 | HP PUSCH2

CC0 | CC0 LP PUCCH carrying A-CSI

CC1 | CC1 LP PUSCH3 carrying SP-CSI

CC2 | HP PUSCH4

CC0 | LP SR PUCCH (PF1)

CC0 | HP HARQ-ACK (PF1)

CC1 | HP PUSCH

UPLINK TRANSMISSION PROCESSING METHOD AND APPARATUS, AND TERMINAL

CROSS-REFERENCE TO RELATED APPLICATIONS

This application is a continuation application of International Application No. PCT/CN2021/123537 filed on Oct. 13, 2021, which claims the priority of Chinese Patent Application No. 202011105908.0 filed in China on Oct. 15, 2020, the entire content of which is hereby incorporated by reference.

TECHNICAL FIELD

This application relates to the field of communication technologies, and specifically, to an uplink transmission processing method and apparatus, and a terminal.

BACKGROUND

When a terminal configured with two carriers in a single cell or configured with carrier aggregation (CA) performs uplink power allocation, if a total transmission power of all transmissions within a frequency range exceeds a maximum transmission power of the terminal, the terminal allocates power in a specified priority order, so that the total transmission power does not exceed the maximum transmission power of the terminal.

However, in some cases, a physical uplink control channel (PUCCH) and a physical uplink shared channel (PUSCH) with the same priority have the same power allocation priority. If simultaneous transmission of the PUCCH and the PUSCH with the same priority are supported, the specified power allocation cannot be performed. In addition, when a plurality of resources are transmitted in one slot, time domain resources may overlap, and simultaneous transmission of overlapping channels may affect transmission quality.

In addition, a PUCCH and a PUCCH with different priorities or multiplexing of a PUCCH and a PUSCH may cause high-priority UCI to be multiplexed on a low-priority PUCCH or PUSCH, and reliability of the high-priority uplink control information (UCI) cannot be ensured.

SUMMARY

Embodiments of this application provide an uplink transmission processing method and apparatus, and a terminal.

According to a first aspect, an embodiment of this application provides an uplink transmission processing method, applied to a terminal, including:

in a case that time domain resources of a first uplink transmission and a second uplink transmission overlap, performing at least of the following:

determining a relative priority between the first uplink transmission and the second uplink transmission according to a first rule, and allocating transmission power of the first uplink transmission and the second uplink transmission based on the relative priority; or performing channel transmission according to a second rule.

According to a second aspect, an embodiment of this application provides an uplink transmission processing apparatus, including:

a processing module, configured to, in a case that time domain resources of a first uplink transmission and a second uplink transmission overlap, perform at least of the following:

determining a relative priority between the first uplink transmission and the second uplink transmission according to a first rule, and allocating transmission power of the first uplink transmission and the second uplink transmission based on the relative priority; or performing channel transmission according to a second rule.

According to a third aspect, an embodiment of this application further provides a terminal, where the terminal includes a processor, a memory, and a program or an instruction stored in the memory and capable of being run on the processor, and the program or the instruction, when executed by the processor, implements the steps of the method according to the first aspect.

According to a fourth aspect, an embodiment of this application further provides a readable storage medium, where the readable storage medium stores a program or an instruction, and the program or the instruction, when executed by a processor, implements the steps of the method according to the first aspect.

According to a fifth aspect, an embodiment of this application provides a chip, where the chip includes a processor and a communication interface, the communication interface is coupled with the processor, and the processor is configured to run a program or an instruction to implement the method according to the first aspect.

According to a sixth aspect, an embodiment of this application provides a computer program product, where the computer program product is stored in a non-volatile storage medium, the program product is executed by at least one processor to implement the steps of the method according to the first aspect.

In this way, in the embodiments of this application, after the relative priority of power allocation between the first uplink transmission and the second uplink transmission is obtained according to the first rule, specified transmission power allocation can be performed; and in a case that the time domain resources of the first uplink transmission and the second uplink transmission overlap, higher-quality transmission can be realized according to the second rule.

BRIEF DESCRIPTION OF THE DRAWINGS

FIG. 1 is a block diagram of a wireless communication system;

FIG. 2 is a schematic flowchart of an uplink transmission processing method according to an embodiment of this application;

DETAILED DESCRIPTION

Figures 3, 4, 5:
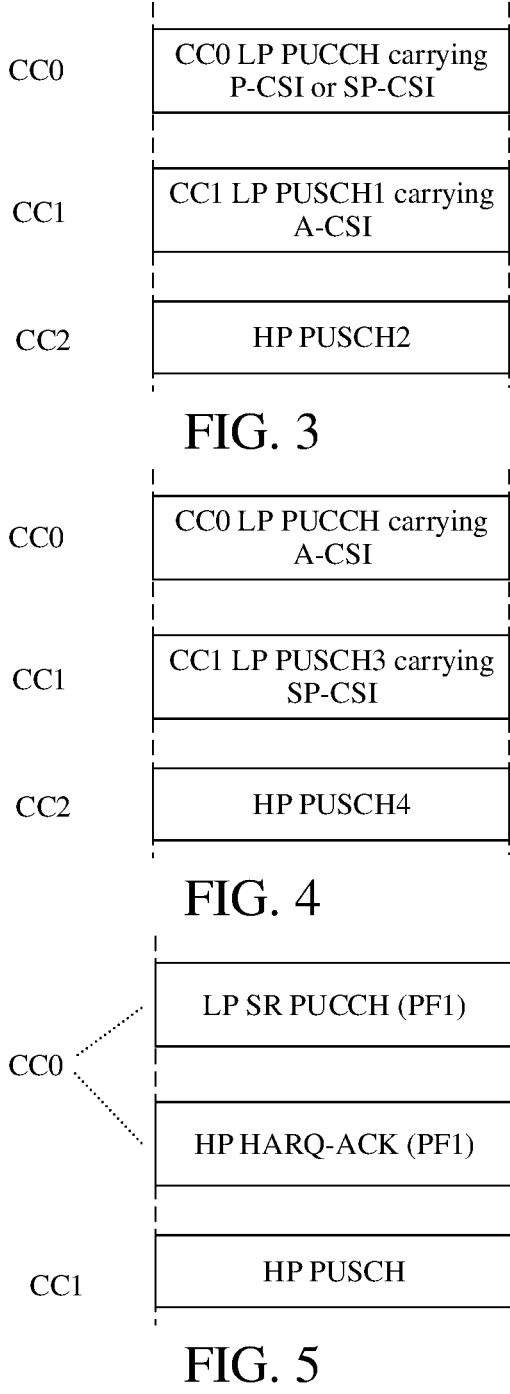
FIG. 3 is a transmission example diagram 1.
FIG. 4 is a transmission example diagram 2.
FIG. 5 is a transmission example diagram 3.

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application can be implemented in an order other than those illustrated or described herein. In addition, "and/or" in this specification and the claims represents at least one of the connected objects. A character "/" generally indicates an "or" relationship between the associated objects.

It should be noted that, the technologies described in the embodiments of this application are not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a new radio (NR) system for an exemplary objective, and uses NR terms in most of the following description, and such technologies may also be applied to applications except an NR system application, such as a 6th generation (6G) communication system.

FIG. 1 shows a block diagram of a wireless communication system that may be applied to an embodiment of this application; The wireless communication system includes a terminal 11 and a network device 12. The terminal 11 may also be referred to as a terminal device or a user equipment (UE). The terminal 11 may be a mobile phone, a tablet personal computer, a laptop computer also referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

The following describes an uplink transmission processing method provided in the embodiments of this application in detail with reference to the accompanying drawings by using specific embodiments and application scenarios thereof.

The method in the embodiments of this application is applied to a terminal, the terminal may be a UE, such as an access terminal, a subscriber unit, a subscriber station, a mobile station, a mobile console, a remote station, a remote terminal, a mobile device, a user terminal, a terminal, a wireless communications device, a user agent, or a user apparatus. The terminal device terminal may further be a cellular phone, a cordless phone, a session initiation protocol (SIP) phone, a wireless local loop (WLL) station, a personal digital assistant (PDA), a handheld device or a computing device having a wireless communication function, another processing device, vehicle device, or wearable device connected to a wireless modem, or the like.

As shown in FIG. 2, an uplink transmission processing method according to an embodiment of this application is applied to a terminal, and includes:

Step 201: In a case that time domain resources of a first uplink transmission and a second uplink transmission overlap, perform at least of the following:

determining a relative priority between the first uplink transmission and the second uplink transmission according to a first rule, and allocating transmission power of the first uplink transmission and the second uplink transmission based on the relative priority; or performing channel transmission according to a second rule.

The first rule is used to determine the relative priority of power allocation between the first uplink transmission and the second uplink transmission, so that in a case that the time domain resources of the first uplink transmission and the second uplink transmission overlap, the terminal can obtain the relative priority of power allocation between the first uplink transmission and the second uplink transmission according to the first rule, and then perform specified transmission power allocation based on the relative priority. The second rule is used for channel transmission, so that in a case that the time domain resources of the first uplink transmission and the second uplink transmission overlap, the terminal can realize higher-quality transmission according to the second rule.

In an optional embodiment of this application, before step 201, the terminal determines a resource of the first uplink transmission, and determines a resource of the second uplink transmission, to determine whether the time domain resources of the first uplink transmission and the second uplink transmission overlap.

In an optional embodiment of this application, the first rule is used to determine the relative priority of power allocation between the first uplink transmission and the second uplink transmission based on an uplink transmission type and/or an uplink transmission bearer information type.

That is, the first rule sets a priority level of power allocation between uplink transmissions based on the uplink transmission type and/or the uplink transmission bearer information type.

In other words, for the first uplink transmission and the second uplink transmission with overlapping time domain resources, the relative priority of power allocation between the first uplink transmission and the second uplink transmission is determined based on respective uplink transmission types and/or bearer information types of the first uplink transmission and the second uplink transmission.

Optionally, the first rule includes at least one of the following:

a power allocation priority of a first physical uplink shared channel (PUSCH) transmission is higher than a power allocation priority of a first physical uplink control channel (PUCCH) transmission;

a power allocation priority of a second PUCCH transmission is higher than the power allocation priority of the first PUSCH transmission;

the power allocation priority of the first PUSCH transmission is higher than a power allocation priority of a third PUCCH transmission;

a power allocation priority of a second PUSCH transmission is higher than the power allocation priority of the second PUCCH transmission;

the power allocation priority of the second PUCCH transmission is higher than a power allocation priority of a third PUSCH transmission; or the power allocation priority of the third PUSCH transmission is higher than the power allocation priority of the third PUCCH transmission, where the first PUSCH transmission carries channel state information (CSI); the first PUCCH transmission carries CSI; the second PUCCH transmission carries aperiodic channel state information (A-CSI); the third PUCCH transmission carries periodic channel state information (P-CSI) or semi-persistent channel state information (SP-CSI): the second PUSCH transmission carries A-SCI; and the third PUSCH transmission carries SP-CSI.

In this way, a power allocation priority of a PUSCH transmission carrying CSI is higher than a power allocation priority of a PUCCH transmission carrying CSI; a power allocation priority of a PUCCH transmission carrying A-CSI is higher than the power allocation priority of the PUSCH transmission carrying CSI; the power allocation priority of the PUSCH transmission carrying CSI is higher than a power allocation priority of a PUCCH transmission carrying P-CSI and/or SP-CSI; a power allocation priority of a PUSCH transmission carrying A-CSI is higher than the power allocation priority of the PUCCH transmission carrying A-CSI; the power allocation priority of the PUCCH transmission carrying A-CSI is higher than a power allocation priority of a PUSCH transmission carrying SP-CSI; and the power allocation priority of the PUSCH transmission carrying SP-CSI is higher than the power allocation priority of the PUCCH transmission carrying P-CSI and/or SP-CSI. Certainly, the first rule is not limited to the foregoing items, and may also be a combination of a plurality of items thereof.

For example, the first rule is: the power allocation priority of the PUSCH transmission carrying CSI is higher than the power allocation priority of the PUCCH transmission carrying CSI. Alternatively, the first rule is: the power allocation priority of the PUSCH transmission carrying A-CSI is higher than the power allocation priority of the PUCCH transmission carrying CSI, and the power allocation priority of the PUSCH transmission carrying CSI is higher than the power allocation priority of the PUCCH transmission carrying P-CSI and/or SP-CSI. Alternatively, the first rule is: the power allocation priority of the PUSCH transmission carrying A-CSI is higher than the power allocation priority of the PUCCH transmission carrying A-CSI, the power allocation priority of the PUCCH transmission carrying A-CSI is higher than the power allocation priority of the PUSCH transmission carrying SP-CSI, and the power allocation priority of the PUSCH transmission carrying SP-SCI is higher than the power allocation priority of the PUCCH transmission carrying P-CSI and/or SP-CSI.

Specifically, for example, the first rule is: the power allocation priority of the PUSCH transmission carrying CSI is higher than the power allocation priority of the PUCCH transmission carrying CSI, and if the first uplink transmission is the PUSCH transmission carrying CSI, and the second uplink transmission is the PUCCH transmission carrying CSI, it can be determined according to the first rule that the relative priority between the first uplink transmission and the second uplink transmission is: the power allocation priority of the first uplink transmission is higher than the power allocation priority of the second uplink transmission.

Optionally, the foregoing power allocation priority is applied to uplink transmissions with the same priority.

If the first rule is: the power allocation priority of the PUSCH transmission carrying CSI is higher than the power allocation priority of the PUCCH transmission carrying CSI, UE can perform power allocation based on the following power allocation priority order (power allocation priorities decrease in turn):

1. Physical random access channel (PRACH) transmission on a primary cell (PRACH transmission on the Pcell);

2. PUCCH or PUSCH transmission with a higher priority index (PUCCH or PUSCH transmissions with higher priority index);

3. For PUCCH or PUSCH transmissions with the same priority index (For PUCCH or PUSCH transmissions with same priority index), follow the following order (power allocation priorities decrease in turn):

PUCCH transmission carrying HARQ-ACK information, and/or an SR, and/or an LRR (PUCCH transmission with HARQ-ACK information, and/or SR, and/or LRR);

PUSCH transmission carrying CSI (PUSCH transmission with CSI);

PUCCH transmission carrying CSI (PUCCH transmission with CSI); and

PUSCH transmission carrying no HARQ-ACK information or CSI, or for a type-2 random access procedure, PUSCH transmission on the Pcell (PUSCH transmission without HARQ-ACK information or CSI and, for Type-2 random access procedure, PUSCH transmission on the PCell).

4. Channel sounding reference signal (SRS) transmission, with an aperiodic SRS having a higher priority than that of a semi-persistent and/or periodic SRS, or PRACH transmission on a serving cell other than the Pcell (SRS transmission, with aperiodic SRS having higher priority than semi-persistent and/or periodic SRS, or PRACH transmission on a serving cell other than the Pcell).

If the first rule is: the power allocation priority of the PUCCH transmission carrying A-CSI is higher than the power allocation priority of the PUSCH transmission carrying CSI, and the power allocation priority of the PUSCH transmission carrying CSI is higher than the power allocation priority of the PUCCH transmission carrying P-CSI and/or SP-CSI, the UE can perform power allocation based on the following power allocation priority order (power allocation priorities decrease in turn):

1. PRACH (Physical Random Access Channel, PRACH) transmission on a primary cell (PRACH transmission on the Pcell);

2. PUCCH or PUSCH transmission with a higher priority index (PUCCH or PUSCH transmissions with higher priority index);

3. For PUCCH or PUSCH transmissions with the same priority index (For PUCCH or PUSCH transmissions with same priority index), follow the following order (power allocation priorities decrease in turn):

PUCCH transmission carrying HARQ-ACK information, and/or an SR, and/or an LRR, and/or A-CSI (PUCCH transmission with HARQ-ACK information, and/or SR, and/or LRR, and/or A-CSI);

PUSCH transmission carrying CSI (PUSCH transmission with CSI);

PUCCH transmission carrying P-CSI and/or SP-CSI (PUCCH transmission with P-CSI and/or SP-CSI); and PUSCH transmission carrying no HARQ-ACK information or CSI, or for a type-2 random access procedure, PUSCH transmission on the Pcell (PUSCH transmission without HARQ-ACK information or CSI and, for Type-2 random access procedure, PUSCH transmission on the PCell).

4. SRS transmission, with an aperiodic SRS having a higher priority than that of a semi-persistent and/or periodic SRS, or PRACH transmission on a serving cell other than the Pcell (SRS transmission, with aperiodic SRS having higher priority than semi-persistent and/or periodic SRS, or PRACH transmission on a serving cell other than the Pcell).

Certainly, if the first rule is: the power allocation priority of the PUSCH transmission carrying A-CSI is higher than the power allocation priority of the PUCCH transmission carrying A-CSI, the power allocation priority of the PUCCH transmission carrying A-CSI is higher than the power allocation priority of the PUSCH transmission carrying SP-CSI, and the power allocation priority of the PUSCH transmission carrying SP-SCI is higher than the power allocation priority of the PUCCH transmission carrying P-CSI and/or SP-CSI, for the PUCCH and PUSCH transmissions with the same priority index, power allocation priorities decrease in turn as follows:

PUSCH transmission carrying A-CSI (PUSCH transmission with A-CSI);

PUCCH transmission carrying A-CSI (PUCCH transmission with A-CSI);

PUSCH transmission carrying SP-CSI (PUSCH transmission with SP-CSI); and

PUCCH transmission carrying P-CSI and/or SP-CSI (PUCCH transmission with P-CSI and/or SP-CSI).

In this way, when a cell is configured with two carriers or carrier aggregation is configured, and the UE supports simultaneous transmission of the PUCCH and the PUSCH, the UE performs power allocation according to the foregoing power allocation priority.

Example 1: as shown in FIG. 3, time domain resources of a low-priority (LP) PUCCH (corresponding to carrier CC0) carrying P-CSI or SP-CSI, a low-priority PUSCH1 (corresponding to CC1) carrying A-CSI, and a high-priority (HP) PUSCH2 (corresponding to CC2) overlap, and the three channels are on different serving cells. If the terminal supports simultaneous transmission of the PUCCH and the PUSCH, the UE can transmit the PUCCH carrying P-CSI or SP-CSI, the low-priority PUSCH1 carrying A-CSI, and the high-priority PUSCH2 simultaneously. During power allocation, if a total transmission power, on each symbol of a transmission occasion (transmission occasion), of the PUCCH, the PUSCH1, and the PUSCH2 exceeds a maximum transmission power of the UE, the UE performs the power allocation based on a relative priority determined according to the first rule, such as a power allocation priority of the PUSCH2>a power allocation priority of the PUSCH1>a power allocation priority of the PUCCH, so that the total transmission power on each symbol of the transmission occasion does not exceed the maximum transmission power of the UE.

Example 2: as shown in FIG. 4, time domain resources of a low-priority PUCCH (corresponding to carrier CC0) carrying A-CSI, a low-priority PUSCH3 (corresponding to CC1) carrying SP-CSI, and a high-priority PUSCH4 (corresponding to CC2) overlap, and the three channels are on different serving cells. During power allocation, if a total transmission power of the PUCCH, the PUSCH3, and the PUSCH4 exceeds a maximum transmission power of the UE, the UE performs power allocation based on a relative priority determined according to the first rule, such as a power allocation priority of the PUSCH4>a power allocation priority of the PUCCH>a power allocation priority of the PUSCH3, so that the total transmission power does not exceed the maximum transmission power of the UE.

In this application, the A-CSI carried by the PUCCH mainly refers to CSI carried by the PUCCH and with aperiodic characteristics other than CSI sent periodically, such as P-CSI and/or SP-CSI, mainly refers to CSI sent by the terminal, triggered by the base station dynamically, on the PUCCH, and may also be referred to as triggered CSI or the like.

In an optional embodiment of this application, the first rule is used to determine the relative priority of power allocation between the first uplink transmission and the second uplink transmission based on a priority of uplink control information (UCI) carried by an uplink transmission and/or a priority of the uplink transmission.

That is, the first rule sets a priority level of power allocation between uplink transmissions based on the priority of the uplink control information (UCI) carried by the uplink transmission and/or the priority of the uplink transmission.

In other words, for the first uplink transmission and the second uplink transmission with overlapping time domain resources, the relative priority of power allocation between the first uplink transmission and the second uplink transmission is determined based on respective priorities and/or priorities of carried UCI of the first uplink transmission and the second uplink transmission.

Optionally, the first rule includes at least one of the following:

a power allocation priority of a third uplink transmission is higher than a power allocation priority of a fourth uplink transmission;

a power allocation priority of a fifth uplink transmission is higher than the power allocation priority of the fourth uplink transmission;

the power allocation priority of the third uplink transmission is the same as a power allocation priority of a sixth uplink transmission;

the power allocation priority of the third uplink transmission is higher than the power allocation priority of the sixth uplink transmission;

a transmission priority of the power allocation priority of the sixth uplink transmission is higher than that of the power allocation priority of the fourth uplink transmission; or the power allocation priority of the third uplink transmission is different from the power allocation priority of the sixth uplink transmission, where the third uplink transmission is a PUSCH or PUCCH transmission with a high priority; the fourth uplink transmission is another PUCCH or PUSCH transmission; the fifth uplink transmission is a PUSCH or PUCCH transmission carrying high-priority UCI; the sixth uplink transmission is a PUSCH or PUCCH transmission with a low priority and carrying high-priority UCI; and the another PUCCH or PUSCH transmission is a PUCCH or PUSCH transmission with a low priority and carrying no high-priority UCI.

In this way, a power allocation priority of the PUSCH or PUCCH transmission with a high priority is higher than a power allocation priority of another PUCCH or PUSCH transmission, a power allocation priority of the PUSCH or PUCCH transmission with high-priority UCI is higher than the power allocation priority of the another PUCCH or PUSCH transmission, and the power allocation priority of the PUSCH or PUCCH transmission with a high priority is the same as a power allocation priority of the PUSCH or PUCCH transmission with a low priority and carrying high-priority UCI. The power allocation priority of the PUSCH or PUCCH transmission with a high priority is higher than the power allocation priority of the PUSCH or PUCCH transmission with a low priority and carrying high-priority UCI, the power allocation priority of the PUSCH or PUCCH transmission with a low priority and carrying high-priority UCI is higher than the power allocation priority of the another PUCCH or PUSCH transmission, and the power allocation priority of the PUSCH or PUCCH transmission with a high priority is different from the power allocation priority of the PUSCH or PUCCH transmission with a low priority and carrying high-priority UCI. Certainly, the first rule is not limited to the foregoing items, and may also be a combination of a plurality of items thereof.

The PUSCH or PUCCH transmission with a high priority may be a PUSCH or PUCCH transmission with a high priority and carrying high-priority UCI; may be a PUSCH or PUCCH transmission with a high priority and carrying low-priority UCI; or may be a PUSCH or PUCCH transmission with a high priority and carrying no UCI.

Specifically, for example, the first rule is: the power allocation priority of the PUSCH or PUCCH transmission with a high priority is higher than the power allocation priority of the PUSCH or PUCCH transmission with a low priority and carrying high-priority UCI, and if the first uplink transmission is the PUSCH transmission with a low priority and carrying high-priority UCI, and the second uplink transmission is the PUCCH transmission with a high priority and carrying high-priority UCI, it can be determined according to the first rule that the relative priority between the first uplink transmission and the second uplink transmission is: the power allocation priority of the second uplink transmission is higher than the power allocation priority of the first uplink transmission.

For the PUSCH or PUCCH transmission with a high priority in this application, the priority can be represented by a priority index. For example, a low priority corresponds to a small priority index such as 0, and a high priority corresponds to a large priority index such as 1.

For example, the first rule is: the power allocation priority of the PUSCH or PUCCH transmission with a high priority is the same as the power allocation priority of the PUSCH or PUCCH transmission with a low priority and carrying high-priority UCI, and both of the two are higher than the power allocation priority of the another PUCCH or PUSCH transmission. Alternatively, the first rule is: the power allocation priority of the PUSCH or PUCCH transmission with a high priority is higher than the power allocation priority of the PUSCH or PUCCH transmission with a low priority and carrying high-priority UCI, and the power allocation priority of the PUSCH or PUCCH transmission with a low priority and carrying high-priority UCI is higher than the power allocation priority of the another PUCCH or PUSCH transmission.

If the first rule is: the power allocation priority of the PUSCH or PUCCH transmission with a high priority is the same as the power allocation priority of the PUSCH or PUCCH transmission with a low priority and carrying high-priority UCI, and both of the two are higher than the power allocation priority of the another PUCCH or PUSCH transmission, the UE performs power allocation based on the following power allocation priority order (power allocation priorities decrease in turn):

1. PRACH (Physical Random Access Channel, PRACH) transmission on a primary cell (PRACH transmission on the Pcell);

2. PUCCH or PUSCH transmission carrying UCI of a higher priority index or set with a higher priority index (PUCCH or PUSCH transmissions including UCI of higher priority index or with higher priority index);

3. For PUCCH or PUSCH transmission with a priority index 0 and carrying no UCI of a higher priority index, or for PUCCH or PUSCH transmission with a priority index 1 or carrying UCI of a priority index 1 (For PUCCH or PUSCH transmissions with priority index 0 and including no UCI of higher priority index, or for PUCCH or PUSCH transmissions with priority index 1 or including UCI with priority index 1):

PUCCH transmission carrying HARQ-ACK information, and/or an SR, and/or an LRR, or PUSCH transmission carrying HARQ-ACK information (PUCCH transmission with HARQ-ACK information, and/or SR, and/or LRR, or PUSCH transmission with HARQ-ACK information);

PUCCH transmission carrying CSI or PUSCH transmission carrying CSI (PUCCH transmission with CSI or PUSCH transmission with CSI); and PUSCH transmission carrying no HARQ-ACK information or CSI, or for a type-2 random access procedure, PUSCH transmission on the Pcell (PUSCH transmission without HARQ-ACK information or CSI and, for Type-2 random access procedure, PUSCH transmission on the PCell).

5. SRS transmission, with an aperiodic SRS having a higher priority than that of a semi-persistent and/or periodic SRS, or PRACH transmission on a serving cell other than the Pcell (SRS transmission, with aperiodic SRS having higher priority than semi-persistent and/or periodic SRS, or PRACH transmission on a serving cell other than the Pcell).

Certainly, if the first rule is: the power allocation priority of the PUSCH or PUCCH transmission with a high priority is higher than the power allocation priority of the PUSCH or PUCCH transmission with a low priority and carrying high-priority UCI, and the power allocation priority of the PUSCH or PUCCH transmission with a low priority and carrying high-priority UCI is higher than the power allocation priority of the another PUCCH or PUSCH transmission, the UE performs power allocation based on the following power allocation priority order (power allocation priorities decrease in turn):

1. PRACH (Physical Random Access Channel, PRACH) transmission on a primary cell (PRACH transmission on the Pcell);

2. PUCCH or PUSCH transmission with a higher priority index (PUCCH or PUSCH transmissions with higher priority index);

3. PUCCH or PUSCH transmission with a lower priority index and carrying UCI of a higher priority index (PUCCH or PUSCH transmissions with lower priority index and including UCI of higher priority index);

4. For PUCCH or PUSCH transmission with a priority index 0 and carrying no UCI of a higher priority index, or for PUCCH or PUSCH transmission with a priority index 0 and carrying UCI of a higher priority index, or for PUCCH or PUSCH transmission with a priority index 1 or carrying UCI with a priority index 1 (For PUCCH or PUSCH transmissions with priority index 0 and including no UCI of higher priority index, or for PUCCH or PUSCH transmissions with priority index 0 and including UCI of higher priority index, or for PUCCH or PUSCH transmissions with priority index 1 or including UCI with priority index 1):

PUCCH transmission carrying HARQ-ACK information, and/or an SR, and/or an LRR, or PUSCH transmission carrying HARQ-ACK information (PUCCH transmission with HARQ-ACK information, and/or SR, and/or LRR, or PUSCH transmission with HARQ-ACK information);

PUCCH transmission carrying CSI or PUSCH transmission carrying CSI (PUCCH transmission with CSI or PUSCH transmission with CSI); and PUSCH transmission carrying no HARQ-ACK information or CSI, or for a type-2 random access procedure, PUSCH transmission on the Pcell (PUSCH transmission without HARQ-ACK information or CSI and, for Type-2 random access procedure, PUSCH transmission on the PCell).

5. SRS transmission, with an aperiodic SRS having a higher priority than that of a semi-persistent and/or periodic SRS, or PRACH transmission on a serving cell other than the Pcell (SRS transmission, with aperiodic SRS having higher priority than semi-persistent and/or periodic SRS, or PRACH transmission on a serving cell other than the Pcell).

In this embodiment, a priority of an uplink transmission with a priority index 1 is higher than a priority of an uplink transmission with a priority index 0.

In this way, when the UE supports a PUCCH and a PUCCH with different priorities or multiplexing of a PUCCH and a PUSCH, and the UE transmits PUCCHs or PUSCHs carrying UCI with different priorities, the UE performs power allocation based on the foregoing power allocation priority.

Example 3: as shown in FIG. 5, the UE supports channel multiplexing between different priorities, and supports simultaneous transmission of the PUCCH and the PUSCH. If time domain resources of an LP SR PUCCH (that is, a low-priority PUCCH carrying an SR) and an HP HARQ-ACK PUCCH (that is, a high-priority PUCCH carrying HARQ-ACK) overlap, and both of the two are in PUCCH format (PF) 1, the UE multiplexes HP HARQ-ACK on the LP SR PUCCH, and then the UE transmits an LP PUCCH (with HP HARQ-ACK) and an HP PUSCH simultaneously. The UE performs power allocation based on a relative priority determined according to the first rule, that is, a power allocation priority of an LP PUCCH with a low priority and carrying high-priority UCI is higher than a power allocation priority of an HP PUSCH carrying no UCI, so that the total transmission power does not exceed the maximum transmission power of the UE.

In an optional embodiment of this application, the second rule includes:

in a case that time domain resources of a PUCCH transmission carrying CSI and a PUSCH transmission carrying CSI overlap, the channel transmission is performed based on an uplink transmission type and/or an uplink transmission bearer information type.

That is, a transmission channel can be determined, according to the second rule based on the uplink transmission type and/or the uplink transmission bearer information type.

In other words, for the first uplink transmission and the second uplink transmission with overlapping time domain resources, the transmission channel is determined based on respective uplink transmission types and/or bearer information types of the first uplink transmission and the second uplink transmission, to complete the channel transmission.

The PUCCH transmission carrying CSI can carry only the CSI, or can carry other information, and the other information is UCI other than the CSI, such as HARQ-ACK, and an SR. Similarly, the PUSCH transmission carrying CSI can carry only the CSI but not limited to the CSI. For example, the PUSCH transmission carrying CSI further carries an uplink shared channel UL-SCH.

Optionally, the terminal is configured to transmit the PUCCH and the PUSCH simultaneously.

Optionally, the CSI carried by the PUCCH transmission includes P-CSI and/or SP-CSI; and the CSI carried by the PUCCH transmission includes A-CSI and the PUSCH transmission carries A-CSI; or the CSI carried by the PUCCH transmission includes A-CSI and the PUSCH transmission carries SP-CSI.

In an optional embodiment of this application, optionally, in step 201, the performing channel transmission according to a second rule includes at least one of the following:

transmitting the PUCCH and the PUSCH simultaneously;

discarding the PUCCH and transmitting the PUSCH; or discarding the CSI carried by the PUCCH and transmitting the PUCCH with the CSI discarded and the PUSCH.

In this way, based on different second rules, the channel transmission may be transmitting the PUCCH and the PUSCH simultaneously; may be discarding the PUCCH and transmitting the PUSCH; or may be discarding the CSI carried by the PUCCH and transmitting the PUCCH with the CSI discarded and the PUSCH. Certainly, the transmitted PUCCH with the CSI discarded may carry information other than the CSI. Discarding one channel or information may also be understood as that the terminal does not transmit the channel or the information.

For example, if the PUCCH transmission carries A-CSI, and the PUSCH transmission carries SP-CSI, the UE may transmit the PUCCH and the PUSCH simultaneously; or discard the PUSCH and transmit the PUCCH. If the PUCCH transmission carries A-CSI, and the PUSCH transmission carries A-CSI, the UE may transmit the PUCCH and the PUSCH simultaneously, or discard the PUCCH and transmit the PUSCH, or determine, based on a sequence of DCI corresponding to the PUCCH and the PUSCH, which one to be transmitted and the other one to be discarded.

It should be known that, in a scenario of transmitting the PUCCH and the PUSCH simultaneously, a relative priority of power allocation between the PUCCH and the PUSCH can be determined according to the first rule, and then corresponding transmission power is allocated for transmission.

Considering the existence of other information, in this embodiment, optionally, the second rule includes:

the channel transmission is performed based on whether the PUCCH transmission carries other information in addition to the CSI, where the other information is UCI other than the CSI.

On the basis of the uplink transmission type and/or the uplink transmission bearer information type, the channel transmission may also be performed with reference to whether the PUCCH transmission carries the other information.

Optionally, that the channel transmission is performed based on whether the PUCCH transmission carries other information in addition to the CSI includes:

in a case that the PUCCH transmission carries the other information, discarding the CSI carried by the PUCCH and transmitting the PUCCH with the CSI discarded and the PUSCH; or in a case that the PUCCH transmission does not carry the other information, discarding the PUCCH and transmitting the PUSCH.

In this way, for the PUCCH transmission carrying the other information, the CSI carried by the PUCCH may be discarded, and the PUCCH with the CSI discarded and the PUSCH are transmitted. In this case, the transmitted PUCCH carries the other information. For the PUCCH transmission not carrying the other information, the PUCCH may be discarded, and the PUSCH is transmitted, that is, the PUCCH is not be transmitted.

For example, the first uplink transmission is the PUCCH transmission, and the second uplink transmission is the PUSCH transmission. If the PUCCH transmission carries only P-CSI and/or SP-CSI, and the PUSCH transmission carries CSI (such as SP-CSI or A-CSI), according to the second rule, on one hand, the UE may transmit the PUCCH and the PUSCH simultaneously, so that the base station can obtain CSI information carried on the PUCCH and the PUSCH simultaneously. The disadvantages are that transmitting the PUCCH and the PUSCH simultaneously may affect respective transmission quality and increase a peak to average power ratio PAPR. In addition, transmission quality of the two channels cannot be ensured when the transmission power of the UE is limited. On the other hand, the UE may discard the PUCCH and transmit the PUSCH, so that the base station can obtain the CSI information carried by the PUSCH at high quality.

If the PUCCH transmission carries, in addition to the A-CSI, other information such as HARQ-ACK, on one hand, the UE may transmit the PUCCH and the PUSCH simultaneously. On the other hand, the UE may discard the A-CSI carried by the PUCCH and transmit the PUCCH with the A-CSI discarded (that is, the PUCCH carrying only the HARQ-ACK) and the PUSCH.

Similarly, if the PUCCH transmission carries other information in addition to the P-CSI and/or SP-CSI, on one hand, the UE may transmit the PUCCH and the PUSCH simultaneously. On the other hand, the UE may discard the CSI carried by the PUCCH and transmit the PUCCH with the CSI discarded (that is, the PUCCH carrying only the other information) and the PUSCH.

Certainly, for the other information carried by the PUCCH, there is no need to transmit the other information if not necessary. For example, the PUCCH transmission carries other information in addition to the P-CSI and/or SP-CSI. If the other information includes only a scheduling request SR, and the PUSCH includes a UL-SCH, the UE discards the PUCCH and transmits the PUSCH. If the other information includes only HARQ-ACK, the UE discards the CSI carried by the PUCCH and transmits the PUCCH carrying only the HARQ-ACK and the PUSCH. If the other information includes HARQ-ACK and an SR, the UE may discard the CSI carried by the PUCCH and transmit the PUCCH carrying the HARQ-ACK and the SR and the PUSCH, or may discard the CSI and the SR carried by the PUCCH (for example, in a case that the PUSCH further includes a UL-SCH in addition to the CSI) and transmit the PUCCH carrying only the HARQ-ACK and the PUSCH.

In this embodiment, optionally, the discarding the PUCCH and transmitting the PUSCH includes:

in a case that the other information carried by the PUCCH transmission includes only a scheduling request SR, and the PUSCH transmission carries uplink shared channel UL-SCH information, discarding the PUCCH and transmitting the PUSCH.

Herein, if the other information carried by the PUCCH transmission includes only the SR, and the PUSCH transmission carries UL-SCH information, the PUCCH may be discarded, and the PUSCH is transmitted.

In an optional embodiment of this application, the second rule includes:

in a case that the PUCCH transmission carries A-CSI, and the PUSCH transmission carries A-CSI, the channel transmission is performed based on a start time and/or an end time of corresponding downlink control information (DCI).

That the channel transmission is performed based on a start time and/or an end time of corresponding downlink control information (DCI) includes:

performing transmission on a channel with an earliest start time and/or end time of the corresponding DCI in the first uplink transmission and the second uplink transmission.

In this case, the transmission channel determined according to the second rule is a channel with an earliest start time and/or end time of DCI corresponding to the uplink transmission. For example, the PUCCH transmission carries A-CSI, and the PUSCH transmission carries A-CSI. If a start time of DCI corresponding to the PUCCH transmission is earlier than a start time of DCI corresponding to the PUSCH transmission, the PUCCH is transmitted. If the start time of the DCI corresponding to the PUCCH transmission is later than the start time of the DCI corresponding to the PUSCH transmission, the PUSCH is transmitted. Similarly, this may also apply to the end time of the DCI corresponding to the uplink transmission, and details are not described herein again.

Certainly, the transmission channel determined according to the second rule may alternatively be a channel with a latest start time and/or end time of the DCI corresponding to the uplink transmission, that is, transmission is performed on a channel with a latest start time and/or end time of the corresponding DCI in the first uplink transmission and the second uplink transmission.

In addition, in this embodiment, optionally, the first uplink transmission and the second uplink transmission correspond to different serving cells.

In this way, the terminal is configured to transmit the first uplink transmission and the second uplink transmission simultaneously, and the first uplink transmission and the second uplink transmission correspond to different serving cells.

It should be noted that, in the uplink transmission processing method provided in this embodiment of this application, an execution entity may be an uplink transmission processing apparatus, or a control module in the uplink transmission processing apparatus that is configured to perform and load the uplink transmission processing method. In an embodiment of this application, the uplink transmission processing method provided in this embodiment of this application is described by using an example in which the uplink transmission processing apparatus performs and loads the uplink transmission processing method.

Figures 6, 7:
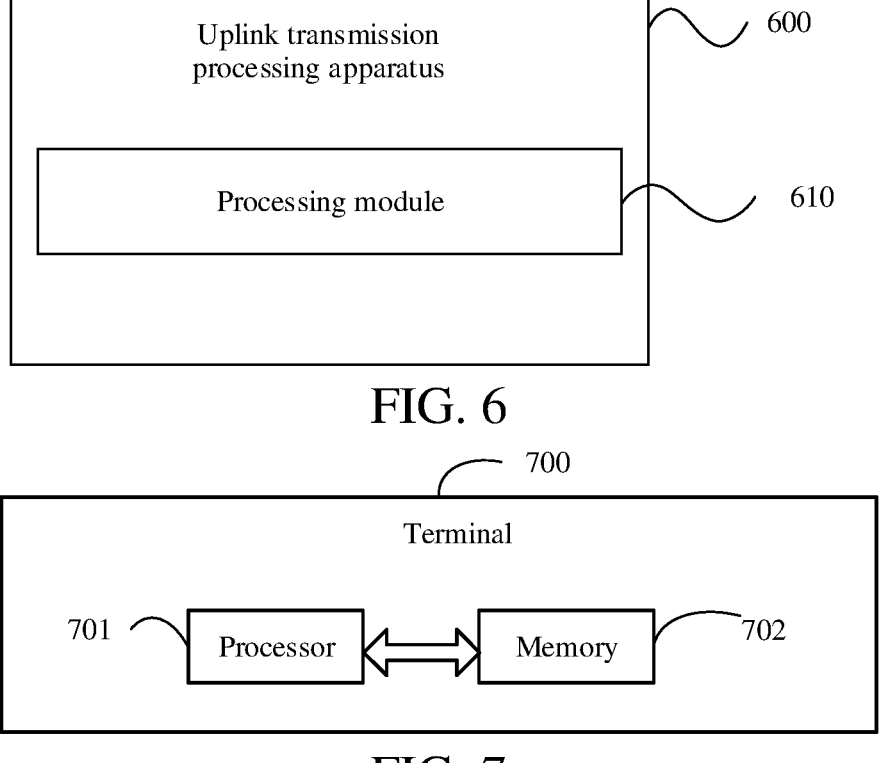
FIG. 6 is a schematic structural diagram of an uplink transmission processing apparatus according to an embodiment of this application.
FIG. 7 is a schematic structural diagram of a terminal according to an embodiment of this application.

As shown in FIG. 6, an uplink transmission processing apparatus 600 according to this embodiment of this application includes:

a processing module 610, configured to, in a case that time domain resources of a first uplink transmission and a second uplink transmission overlap, perform at least of the following:

determining a relative priority between the first uplink transmission and the second uplink transmission according to a first rule, and allocating transmission power of the first uplink transmission and the second uplink transmission based on the relative priority; or performing channel transmission according to a second rule.

The first rule is used to determine the relative priority of power allocation between the first uplink transmission and the second uplink transmission, so that in a case that the time domain resources of the first uplink transmission and the second uplink transmission overlap, the terminal can obtain the relative priority of power allocation between the first uplink transmission and the second uplink transmission according to the first rule, and then perform specified transmission power allocation based on the relative priority. The second rule is used for channel transmission, so that in a case that the time domain resources of the first uplink transmission and the second uplink transmission overlap, the terminal can realize higher-quality transmission according to the second rule.

Optionally, the apparatus further includes a determining module. The determining module is configured to determine a resource of the first uplink transmission, and determine a resource of the second uplink transmission, to determine whether the time domain resources of the first uplink transmission and the second uplink transmission overlap.

Optionally, the first rule is used to determine the relative priority of power allocation between the first uplink transmission and the second uplink transmission based on an uplink transmission type and/or an uplink transmission bearer information type.

Optionally, the first rule includes at least one of the following:

a power allocation priority of a first physical uplink shared channel (PUSCH) transmission is higher than a power allocation priority of a first physical uplink control channel (PUCCH) transmission;

a power allocation priority of a second PUCCH transmission is higher than the power allocation priority of the first PUSCH transmission;

the power allocation priority of the first PUSCH transmission is higher than a power allocation priority of a third PUCCH transmission;

a power allocation priority of a second PUSCH transmission is higher than the power allocation priority of the second PUCCH transmission;

the power allocation priority of the second PUCCH transmission is higher than a power allocation priority of a third PUSCH transmission; or the power allocation priority of the third PUSCH transmission is higher than the power allocation priority of the third PUCCH transmission, where the first PUSCH transmission carries channel state information (CSI); the first PUCCH transmission carries CSI; the second PUCCH transmission carries aperiodic channel state information (A-CSI); the third PUCCH transmission carries periodic channel state information (P-CSI) or semi-persistent channel state information (SP-CSI); the second PUSCH transmission carries A-SCI; and the third PUSCH transmission carries SP-CSI.

Optionally, the first rule is used to determine the relative priority of power allocation between the first uplink transmission and the second uplink transmission based on a priority of uplink control information (UCI) carried by an uplink transmission and/or a priority of the uplink transmission.

Optionally, the first rule includes at least one of the following:

a power allocation priority of a third uplink transmission is higher than a power allocation priority of a fourth uplink transmission;

a power allocation priority of a fifth uplink transmission is higher than the power allocation priority of the fourth uplink transmission;

the power allocation priority of the third uplink transmission is the same as a power allocation priority of a sixth uplink transmission;

the power allocation priority of the third uplink transmission is higher than the power allocation priority of the sixth uplink transmission;

a transmission priority of the power allocation priority of the sixth uplink transmission is higher than that of the power allocation priority of the fourth uplink transmission; or the power allocation priority of the third uplink transmission is different from the power allocation priority of the sixth uplink transmission, where the third uplink transmission is a PUSCH or PUCCH transmission with a high priority; the fourth uplink transmission is another PUCCH or PUSCH transmission; the fifth uplink transmission is a PUSCH or PUCCH transmission carrying high-priority UCI; the sixth uplink transmission is a PUSCH or PUCCH transmission with a low priority and carrying high-priority UCI; and the another PUCCH or PUSCH transmission is a PUCCH or PUSCH transmission with a low priority and carrying no high-priority UCI.

Optionally, the second rule includes:

in a case that time domain resources of a PUCCH transmission carrying CSI and a PUSCH transmission carrying CSI overlap, the channel transmission is performed based on an uplink transmission type and/or an uplink transmission bearer information type.

Optionally, the second rule includes:

the channel transmission is performed based on whether the PUCCH transmission carries other information in addition to the CSI, where the other information is UCI other than the CSI.

Optionally, the processing module is further configured to perform at least one of the following:

transmitting the PUCCH and the PUSCH simultaneously;

discarding the PUCCH and transmitting the PUSCH; or discarding the CSI carried by the PUCCH and transmitting the PUCCH with the CSI discarded and the PUSCH.

Optionally, that the channel transmission is performed based on whether the PUCCH transmission carries other information in addition to the CSI includes:

in a case that the PUCCH transmission carries the other information, discarding the CSI carried by the PUCCH and transmitting the PUCCH with the CSI discarded and the PUSCH; or in a case that the PUCCH transmission does not carry the other information, discarding the PUCCH and transmitting the PUSCH.

Optionally, the processing module is further configured to:

in a case that the other information carried by the PUCCH transmission includes only a scheduling request SR, and the PUSCH transmission carries uplink shared channel UL-SCH information, discarding the PUCCH and transmitting the PUSCH.

Optionally, the CSI carried by the PUCCH transmission includes P-CSI and/or SP-CSI; and the CSI carried by the PUCCH transmission includes A-CSI and the PUSCH transmission carries A-CSI; or the CSI carried by the PUCCH transmission includes A-CSI and the PUSCH transmission carries SP-CSI.

Optionally, the second rule includes:

in a case that the PUCCH transmission carries A-CSI, and the PUSCH transmission carries A-CSI, the channel transmission is performed based on a start time and/or an end time of corresponding downlink control information (DCI).

Optionally, that the channel transmission is performed based on a start time and/or an end time of corresponding downlink control information (DCI) includes:

performing transmission on a channel with an earliest start time and/or end time of the corresponding DCI in the first uplink transmission and the second uplink transmission.

Optionally, the terminal is configured to transmit the PUCCH and the PUSCH simultaneously.

Optionally, the first uplink transmission and the second uplink transmission correspond to different serving cells.

After obtaining the relative priority of power allocation between the first uplink transmission and the second uplink transmission according to the first rule, the apparatus can perform specified transmission power allocation; and in a case that the time domain resources of the first uplink transmission and the second uplink transmission overlap, higher-quality transmission can be realized according to the second rule.

It should be noted that, the apparatus is the apparatus of the foregoing method, implementations of the foregoing method embodiment are applicable to the apparatus, and the same technical effects can also be achieved.

The uplink transmission processing apparatus in this embodiment of this application may be an apparatus, or may be a component, an integrated circuit, or a chip in the terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The uplink transmission processing apparatus in this embodiment of this application may be an apparatus with an operating system. The operating system may be an Android operating system, may be an ios operating system, or may be another possible operating system, and is not specifically limited in the embodiments of this application.

The uplink transmission processing apparatus according to this embodiment of this application can implement all processes implemented by the terminal in the method embodiments shown in FIG. 2 to FIG. 5. To avoid repetition, details are not described herein again.

Optionally, as shown in FIG. 7, an embodiment of this application further provides a terminal 700, including a processor 701, a memory 702, and a program or an instruction stored in the memory 702 and capable of being run on the processor 701, and the program or the instruction, when executed by the processor 701, implements all processes of the embodiments of the uplink transmission processing method, and can achieve the same technical effects.

Figure 8:
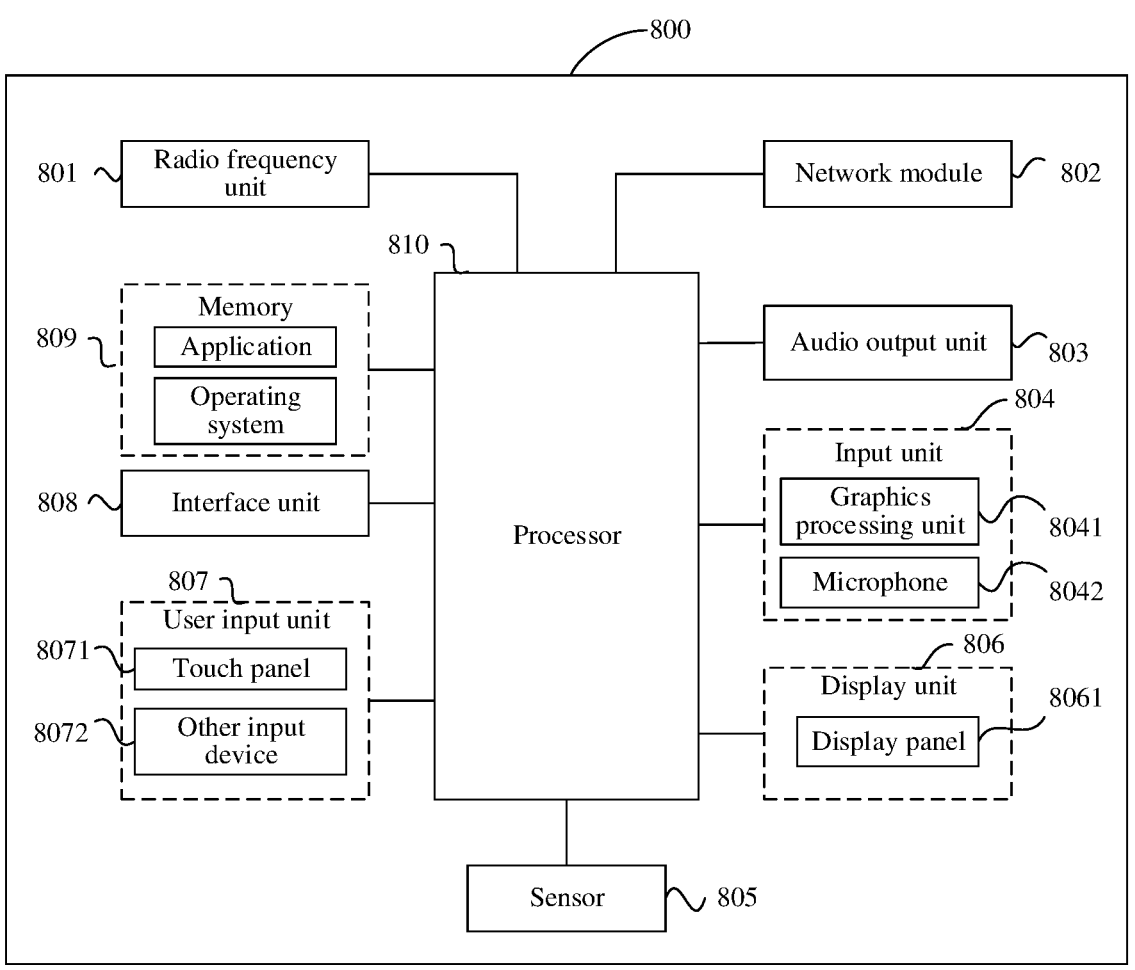
FIG. 8 is a schematic structural diagram of a terminal according to another embodiment of this application.

FIG. 8 is a schematic diagram of a hardware structure of a terminal for implementing the embodiments of this application.

The terminal 800 includes but is not limited to: components such as a radio frequency unit 801, a network module 802, an audio output unit 803, an input unit 804, a sensor 805, a display unit 806, a user input unit 807, an interface unit 808, a memory 809, and a processor 810.

A person skilled in the art may understand that, the terminal 800 may further include a power supply (such as a battery) for supplying power to the components. The power supply may be logically connected to the processor 810 by using a power management system, thereby implementing functions such as charging, discharging, and power consumption management by using the power supply management system. The terminal structure shown in FIG. 8 constitutes no limitation on the terminal, and the terminal may include more or fewer components than those shown in the figure, or some components may be combined, or a different component deployment may be used. Details are not described herein again.

It should be understood that, in this embodiment of this application, the input unit 804 may include a graphics processing unit (GPU) 8041 and a microphone 8042. The graphics processing unit 8041 performs processing on image data of a static picture or a video that is obtained by an image acquisition device (for example, a camera) in a video acquisition mode or an image acquisition mode. The display unit 806 may include a display panel 8061, the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include, but not limited to, a physical keyboard, a functional key (such as a volume control key or a switch key), a track ball, a mouse, and a joystick. Details are not described herein again.

In this embodiment of this application, after receiving downlink data from a network side device, the radio frequency unit 801 sends the downlink data to the processor 810 for processing, and in addition, sends uplink data to the network side device. The radio frequency unit 801 usually includes but is not limited to an antenna, at least one amplifier, a transceiver, a coupler, a low noise amplifier, a duplexer, and the like.

The memory 809 may be configured to store a software program or an instruction and various data. The memory 809 may mainly include a program storage or instruction area and a data storage area. The program storage or instruction area may store an operating system, an application or an instruction required by at least one function (for example, a sound playing function and an image playing function), or the like. In addition, the memory 809 may include a cache random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or other non-volatile solid-state storage devices.

The processor 810 may include one or more processing units. Optionally, the processor 810 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 810.

The processor 810 is configured to, in a case that time domain resources of a first uplink transmission and a second uplink transmission overlap, perform at least of the following:

determining a relative priority between the first uplink transmission and the second uplink transmission according to a first rule, and allocating transmission power of the first uplink transmission and the second uplink transmission based on the relative priority; or performing channel transmission according to a second rule.

After obtaining the relative priority of power allocation between the first uplink transmission and the second uplink transmission according to the first rule, the terminal can perform specified transmission power allocation; and in a case that the time domain resources of the first uplink transmission and the second uplink transmission overlap, higher-quality transmission can be realized according to the second rule.

An embodiment of this application further provides a readable storage medium, where the readable storage medium stores a program or an instruction, and the program or the instruction, when executed by a processor, implements all processes of the embodiments of the uplink transmission processing method, and can achieve the same technical effects. To avoid repetition, details are not described herein again.

The processor is the processor in the electronic device described in the foregoing embodiments. The readable storage medium includes a computer-readable storage medium, for example, a computer read-only memory (ROM for short), a random access memory (RAM for short), a magnetic disk, or an optical disc.

An embodiment of this application further provides a chip. The chip includes a processor and a communication interface. The communication interface is coupled to the processor. The processor is configured to run a program or instructions to implement all processes of the foregoing uplink transmission processing method embodiment, and the same technical effects can be achieved. To avoid repetition, details are not described herein again.

It should be understood that, the chip mentioned in this embodiment of this application may also be referred to as a system-level chip, a system chip, a chip system, a system on chip, or the like.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, and combined. In addition, features described with reference to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. An uplink transmission processing method, applied to a terminal, comprising:

in a case that time domain resources of a first uplink transmission and a second uplink transmission overlap, determining a relative priority between the first uplink transmission and the second uplink transmission according to a first rule, and allocating transmission power of the first uplink transmission and the second uplink transmission based on the relative priority, wherein the first rule is used to determine the relative priority of power allocation between the first uplink transmission and the second uplink transmission based on a priority index of uplink control information (UCI) carried by an uplink transmission and/or a priority index of the uplink transmission, wherein a low priority corresponds to a priority index 0, and a high priority corresponds to a priority index 1, wherein the first rule comprises the following:

a power allocation priority of a fifth uplink transmission is higher than a power allocation priority of a fourth uplink transmission;

a power allocation priority of a third uplink transmission is the same as a power allocation priority of a sixth uplink transmission;

wherein the third uplink transmission is a PUCCH transmission with a high priority; the fourth uplink transmission is another PUCCH or PUSCH transmission; the fifth uplink transmission is a PUSCH transmission carrying high-priority UCI; the sixth uplink transmission is a PUSCH transmission with a low priority and carrying high-priority UCI; and the another PUCCH or PUSCH transmission is a PUCCH or PUSCH transmission with a low priority and carrying no high-priority UCI.

2. The method according to claim 1, wherein the first rule further comprises:

the power allocation priority of the third uplink transmission is higher than the power allocation priority of the fourth uplink transmission.

3. The method according to claim 1, wherein the first uplink transmission and the second uplink transmission correspond to different serving cells.

4. The method according to claim 1, wherein the first rule further comprises at least one of the following:

The power allocation priority of the sixth uplink transmission is higher than that of the power allocation priority of the fourth uplink transmission; or the power allocation priority of the fifth uplink transmission is higher than a power allocation priority of a seventh uplink transmission, wherein the seventh uplink transmission is a PUSCH transmission carrying no HARQ-ACK information or CSI and a priority index of the PUSCH transmission is 1.

5. The method according to claim 1, wherein the first rule is that a power allocation priority of a PUSCH or PUCCH transmission with a high priority is the same as a power allocation priority of a PUSCH transmission with a low priority and carrying high-priority UCI, and both of the two are higher than a power allocation priority of the another PUCCH or PUSCH transmission.

6. An uplink transmission processing apparatus, applied to a terminal, comprising:

a memory, a processor and a computer program stored in the memory and executable by the processor, wherein the processor executes the computer program to:

in a case that time domain resources of a first uplink transmission and a second uplink transmission overlap, determine a relative priority between the first uplink transmission and the second uplink transmission according to a first rule, and allocate transmission power of the first uplink transmission and the second uplink transmission based on the relative priority, wherein the first rule is used to determine the relative priority of power allocation between the first uplink transmission and the second uplink transmission based on a priority index of uplink control information (UCI) carried by an uplink transmission and/or a priority index of the uplink transmission, wherein a low priority corresponds to a priority index 0, and a high priority corresponds to a priority index 1, wherein the first rule comprises the following:

a power allocation priority of a fifth uplink transmission is higher than a power allocation priority of a fourth uplink transmission;

a power allocation priority of a third uplink transmission is the same as a power allocation priority of a sixth uplink transmission;

wherein the third uplink transmission is a PUCCH transmission with a high priority; the fourth uplink transmission is another PUCCH or PUSCH transmission; the fifth uplink transmission is a PUSCH transmission carrying high-priority UCI; the sixth uplink transmission is a PUSCH transmission with a low priority and carrying high-priority UCI; and the another PUCCH or PUSCH transmission is a PUCCH or PUSCH transmission with a low priority and carrying no high-priority UCI.

7. The apparatus according to claim 6, wherein the first rule further comprises:

the power allocation priority of the third uplink transmission is higher than the power allocation priority of the fourth uplink transmission.

8. The apparatus according to claim 6, wherein the first uplink transmission and the second uplink transmission correspond to different serving cells.

9. The apparatus according to claim 6, wherein the first rule further comprises at least one of the following:

the power allocation priority of the sixth uplink transmission is higher than that of the power allocation priority of the fourth uplink transmission;

the power allocation priority of the fifth uplink transmission is higher than a power allocation priority of a seventh uplink transmission, wherein the seventh uplink transmission is a PUSCH transmission carrying no HARQ-ACK information or CSI and a priority index of the PUSCH transmission is 1.

10. The apparatus according to claim 6, wherein the first rule is that a power allocation priority of a PUSCH or PUCCH transmission with a high priority is the same as a power allocation priority of a PUSCH transmission with a low priority and carrying high-priority UCI, and both of the two are higher than a power allocation priority of the another PUCCH or PUSCH transmission.

11. A non-transitory computer readable storage medium, wherein the readable storage medium stores a program or an instruction, a processor executes the program or the instruction to:

in a case that time domain resources of a first uplink transmission and a second uplink transmission overlap, determine a relative priority between the first uplink transmission and the second uplink transmission according to a first rule, and allocate transmission power of the first uplink transmission and the second uplink transmission based on the relative priority, wherein the first rule is used to determine the relative priority of power allocation between the first uplink transmission and the second uplink transmission based on a priority index of uplink control information (UCI) carried by an uplink transmission and/or a priority index of the uplink transmission, wherein a low priority corresponds to a priority index 0, and a high priority corresponds to a priority index 1, wherein the first rule comprises the following:

a power allocation priority of a fifth uplink transmission is higher than a power allocation priority of a fourth uplink transmission;

a power allocation priority of a third uplink transmission is the same as a power allocation priority of a sixth uplink transmission;

wherein the third uplink transmission is a PUCCH transmission with a high priority; the fourth uplink transmission is another PUCCH or PUSCH transmission; the fifth uplink transmission is a PUSCH transmission carrying high-priority UCI; the sixth uplink transmission is a PUSCH transmission with a low priority and carrying high-priority UCI; and the another PUCCH or PUSCH transmission is a PUCCH or PUSCH transmission with a low priority and carrying no high-priority UCI.

12. The non-transitory computer readable storage medium according to claim 11, wherein the first rule further comprises:

The power allocation priority of the third uplink transmission is higher than the power allocation priority of the fourth uplink transmission.

13. The non-transitory computer readable storage medium according to claim 11, wherein the first uplink transmission and the second uplink transmission correspond to different serving cells.

14. The non-transitory computer readable storage medium according to claim 11, wherein the first rule further comprises at least one of the following:

the power allocation priority of the sixth uplink transmission is higher than that of the power allocation priority of the fourth uplink transmission;

the power allocation priority of the fifth uplink transmission is higher than a power allocation priority of a seventh uplink transmission, wherein the seventh uplink transmission is a PUSCH transmission carrying no HARQ-ACK information or CSI and a priority index of the PUSCH transmission is 1.

15. The non-transitory computer readable storage medium according to claim 11, wherein the first rule is that a power allocation priority of a PUSCH or PUCCH transmission with a high priority is the same as a power allocation priority of a PUSCH transmission with a low priority and carrying high-priority UCI, and both of the two are higher than a power allocation priority of the another PUCCH or PUSCH transmission.

\* \* \* \* \*